US009499731B2

(12) United States Patent
Karcher et al.

(10) Patent No.: US 9,499,731 B2
(45) Date of Patent: Nov. 22, 2016

(54) CALCIUM PHOSPHATE CEMENT COMPOSITIONS COMPRISING PUMICE AND/OR PERLITE AND ASSOCIATED METHODS

(71) Applicant: Halliburton Energy Services, Inc., Houston, TX (US)

(72) Inventors: Jeffery D. Karcher, Duncan, OK (US); D. Chad Brenneis, Marlow, OK (US); Lance E. Brothers, Chickasha, OK (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/584,281

(22) Filed: Dec. 29, 2014

(65) Prior Publication Data
US 2015/0107490 A1    Apr. 23, 2015

Related U.S. Application Data

(62) Division of application No. 13/301,747, filed on Nov. 21, 2011.

(51) Int. Cl.
| | |
|---|---|
| *C04B 22/16* | (2006.01) |
| *C09K 8/46* | (2006.01) |
| *C04B 28/00* | (2006.01) |
| *C04B 28/06* | (2006.01) |
| *C04B 28/34* | (2006.01) |
| *C04B 14/16* | (2006.01) |
| *C04B 14/18* | (2006.01) |

(52) U.S. Cl.
CPC .............. *C09K 8/46* (2013.01); *C04B 14/16* (2013.01); *C04B 14/18* (2013.01); *C04B 28/00* (2013.01); *C04B 28/06* (2013.01); *C04B 28/34* (2013.01)

(58) Field of Classification Search
CPC ......... C04B 7/32; C04B 14/16; C04B 14/18; C04B 22/16; C04B 28/00; C04B 28/06; C04B 28/34; C04B 2103/0088; C09K 8/46
See application file for complete search history.

(56) References Cited

U.S. PATENT DOCUMENTS

| | | | |
|---|---|---|---|
| 5,900,053 A | 5/1999 | Brothers et al. | |
| 6,143,069 A | 11/2000 | Brothers et al. | |
| 6,244,343 B1 | 6/2001 | Brothers et al. | |
| 6,332,921 B1 | 12/2001 | Brothers et al. | |
| 6,488,763 B2 | 12/2002 | Brothers et al. | |
| 6,796,378 B2 | 9/2004 | Reddy et al. | |
| 6,846,357 B2 | 1/2005 | Reddy et al. | |
| 7,147,055 B2 | 12/2006 | Brothers et al. | |
| 7,337,842 B2 | 3/2008 | Roddy et al. | |
| 7,350,573 B2 | 4/2008 | Reddy | |
| 7,381,263 B2 | 6/2008 | Roddy et al. | |
| 7,390,356 B2 | 6/2008 | Kulakofsky et al. | |
| 7,398,827 B2 | 7/2008 | Kulakofsky et al. | |
| 7,404,440 B2 | 7/2008 | Reddy et al. | |
| 7,451,817 B2 | 11/2008 | Reddy et al. | |
| 7,612,021 B2 | 11/2009 | Chatterji et al. | |
| 7,631,692 B2 | 12/2009 | Roddy et al. | |
| 7,670,427 B2 * | 3/2010 | Perez-Pena | C04B 28/04 106/727 |
| 7,740,066 B2 | 6/2010 | Xu et al. | |
| 7,743,828 B2 | 6/2010 | Roddy et al. | |
| 7,748,453 B2 | 7/2010 | Reddy | |
| 7,789,150 B2 | 9/2010 | Roddy et al. | |
| 7,863,224 B2 | 1/2011 | Keys et al. | |
| 7,867,954 B2 | 1/2011 | Warrender et al. | |
| 2008/0302276 A1 | 12/2008 | Perez-Pena et al. | |
| 2009/0038800 A1 | 2/2009 | Ravi et al. | |
| 2009/0078161 A1 * | 3/2009 | Woolfsmith | C04B 16/082 106/692 |
| 2009/0105099 A1 | 4/2009 | Warrender et al. | |
| 2010/0016183 A1 | 1/2010 | Roddy et al. | |
| 2010/0240556 A1 | 9/2010 | Keys et al. | |
| 2010/0258312 A1 | 10/2010 | Brenneis et al. | |
| 2010/0282466 A1 | 11/2010 | Brenneis et al. | |
| 2010/0292365 A1 | 11/2010 | Roddy et al. | |
| 2011/0000400 A1 | 1/2011 | Roddy | |
| 2011/0003904 A1 * | 1/2011 | Guevara | C04B 16/08 521/59 |
| 2011/0028594 A1 | 2/2011 | Roddy et al. | |
| 2011/0100626 A1 | 5/2011 | Brenneis et al. | |

FOREIGN PATENT DOCUMENTS

CN    1970484 B    8/2010

OTHER PUBLICATIONS

Derwent-Acc-No. 2010-C74192 (abstract of Chinese Patent Specification No. CN 101659558 A).*
Derwent-Acc-No. 2010-C74191 (abstract of Chinese Patent Specification No. CN 101659559 A).*
Derwent-Acc-No. 2010-C74190 (abstract of Chinese Patent Specification No. CN 101659560 A).*
Derwent-Acc-No. 2010-C74189 (abstract of Chinese Patent Specification No. CN 101659561 A).*
REFCON® Technical Data Sheet, CALUCEM, pp. 1-2, Jun. 2010.
HES Brochure, "ThermaLock™ Cement", pp. 1-2, Apr. 2006.
Secar® 71 Product data sheet, Kerneos Inc., pp. 1-2, Aug. 2006.
Hess Fact Sheet, Hess Pumice Products, Inc., www.hesspumice.com.
HES Brochure, "HR®-25", pp. 1-2, Aug. 2007.
Sugama et al., "Sodium-polyphosphate-modified fly ash/calcium aluminate blend cement: durability in wet, harsh geothermal environments", Elsevier Science B.V., Materials Letters 44 (2000), pp. 45-53, dated May 2000.
Berard et al., "Foamed Calcium Aluminate Phosphate Cement Enables Drilling and Cementation of California Geothermal Wells", SPE 120845, pp. 1-6, dated Mar. 2009.
International Search Report and Written Opinion for PCT/US2012/065911 dated Mar. 26, 2013.
International Preliminary Search Report and Written Opinion for PCT/US2012/065911 dated Jun. 5, 2014.
USPTO Office Action from U.S. Appl. No. 13/301,747 dated May 30, 2014.
USPTO Final Office Action for U.S. Appl. No. 13/301,747 dated Aug. 15, 2016.

* cited by examiner

*Primary Examiner* — Anthony J Green
(74) *Attorney, Agent, or Firm* — Craig W. Roddy; Tumey L.L.P.

(57) ABSTRACT

Methods and compositions are provided that related to cementing operations. Methods and compositions that include pumice and/or perlite as a replacement for fly ash.

16 Claims, No Drawings

CALCIUM PHOSPHATE CEMENT COMPOSITIONS COMPRISING PUMICE AND/OR PERLITE AND ASSOCIATED METHODS

CROSS-REFERENCE TO RELATED APPLICATIONS

The present application is a divisional of U.S. patent application Ser. No. 13/301,747, filed on Nov. 21, 2011, the entire disclosure of which is incorporated herein by reference.

BACKGROUND

The present invention relates to cementing operations and, more particularly, in certain embodiments, to calcium phosphate cement compositions that utilize pumice and/or perlite as a replacement for fly ash.

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

Portland cement is commonly used in subterranean cementing applications. Drawbacks may exist to using Portland cements in certain applications, however, because such cements are prone to corrosive attacks by carbonic acid ($H_2CO_3$). Carbonic acid may be naturally present in a subterranean formation, or it may be produced in the formation by the reaction of subterranean water and carbon dioxide ($CO_2$), when the latter has been injected into the formation, e.g., as in a $CO_2$-enhanced recovery operation. Carbonic acid is believed to react with calcium hydroxide that is present in Portland cement, which reaction may cause the cement to become a soft amorphous gel. This is problematic because, inter alia, it may increase the permeability of the cement. As a result, chloride and hydrogen sulfide ions, which may be present in the subterranean formation, may penetrate the cement sheath and adversely affect, or react with, the casing. The degradation of the cement can cause, inter alia, loss of support for the casing and undesirable interzonal communication of fluids.

It has heretofore been discovered that a set cement material known as calcium phosphate cement formed by an acid-base reaction between calcium aluminate and a phosphate-containing solution can have, for example, high strength, low permeability and excellent carbon dioxide resistance when cured in hydrothermal environments. Compositions containing calcium aluminate and a phosphate-containing solution that react to form calcium phosphate cements may generally be referred to as calcium phosphate cement compositions. Fly ash is often included in the calcium phosphate cement compositions as it is believed that the fly ash reacts with components in the composition to form calcium aluminosilicates, which are resistant to carbonic acid corrosion. However, because fly ash is a waste material there may be drawbacks to its use in the cement compositions. For example, the composition of the fly ash may vary depending upon its source, making it more difficult to design compositions with the fly ash as the variability in composition can impact properties of the cement composition, including its thickening time and pumpability, among others. In addition, supply issues have been encountered with fly ash making its availability as a cement additive unpredictable in some instances.

SUMMARY

An embodiment of the present invention discloses a method of cementing that may comprise introducing a calcium phosphate cement composition into a subterranean formation. The calcium phosphate cement composition may comprise calcium aluminate, sodium polyphosphate, an additive selected from the group consisting of pumice, perlite, and any combination thereof, and water. The method of cementing may further comprise allowing the calcium phosphate cement composition to set.

Another embodiment of the present invention discloses a method of cementing that may comprise introducing a calcium phosphate cement composition into a space between a well bore wall and a conduit. The calcium phosphate cement composition may comprise calcium aluminate in an amount of about 15% to about 60% by weight of the calcium phosphate cement composition. The calcium phosphate cement composition may further comprise sodium polyphosphate in an amount of about 0.5% to about 20% by weight of the calcium phosphate cement composition. The calcium phosphate cement composition may further comprise pumice in an amount of about 15% to about 60% by weight of the calcium phosphate cement composition, wherein the pumice has a mean particle size of less than about 15 microns. The calcium phosphate cement composition may further comprise a cement set retarder and water in an amount sufficient to form a pumpable slurry. The method of cementing may further comprise allowing the calcium phosphate cement composition to set.

Another embodiment of the present invention discloses a cement composition that may comprise calcium aluminate, sodium polyphosphate, an additive selected from the group consisting of pumice, perlite, and any combination thereof, and water.

The features and advantages of the present invention will be readily apparent to those skilled in the art. While numerous changes may be made by those skilled in the art, such changes are within the spirit of the invention.

DESCRIPTION OF PREFERRED EMBODIMENTS

Embodiments of the present invention utilize pumice and/or perlite as a replacement for fly ash in calcium phosphate cement compositions. There may be several potential advantages to the methods and compositions of the present invention, only some of which may be alluded to herein. One of the many potential advantages of the methods and compositions of the present invention is that, since the fly ash is a waste product with a potentially variable composition, its replacement with pumice and/or perlite should result in compositions with less variable properties. Another potential advantage of the methods and compositions of the present invention is that the replacement additive may potentially have a more predictable supply source than fly ash in some instances, thus reducing problems that may be encountered with fly ash availability. Yet another potential advantage is that embodiments of the calcium phosphate cement compositions have been shown to have an unexpected increase in compressive strength with the replacement of fly ash with pumice. By way of example, embodiments of the calcium phosphate cement compositions may have an increase in compressive strength after 7 days at 140° F. of at least about 20% in some instances and, alternatively, at least about 30%, as compared to the same composition comprising a comparable amount of fly ash instead of the pumice.

An embodiment of the calcium phosphate cement compositions of the present invention comprises calcium aluminate, sodium polyphosphate, pumice, and water. Those of ordinary skill in the art will appreciate that the calcium phosphate cement compositions generally should have a density suitable for a particular application. By way of example, the calcium phosphate cement compositions may have a density in the range of from about 4 pounds per gallon ("lb/gal") to about 20 lb/gal and, alternatively, from about 12 lb/gal to about 16 lb/gal. Embodiments of the calcium phosphate cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Embodiments of the calcium phosphate cement compositions of the present invention may comprise calcium aluminate. By way of example, the calcium aluminate can be any commercial grade calcium aluminate suitable for use as a cementitious material. One example of a suitable such calcium aluminate is SECAR 71® calcium aluminate, which is commercially available from Kerneos™ Aluminate Technologies. The calcium aluminate can be included in the calcium phosphate cement compositions in an amount desirable for a particular application as will be evident to those of ordinary skill in the art with the benefit of this disclosure. In some embodiments, the calcium aluminate may be present in an amount of about 15% to about 60% by weight of the composition. In certain embodiments, the calcium aluminate may be present in an amount of about 15% by weight, about 20% by weight, about 25% by weight, about 30% by weight, about 35% by weight, about 40% by weight, about 45% by weight, about 50% by weight, or about 55% by weight. One of ordinary skill in the art, with the benefit of this disclosure, should recognize the appropriate amount of the calcium aluminate to include for a chosen application.

Embodiments of the calcium phosphate cement compositions of the present invention further may comprise sodium polyphosphate. Any of a variety of different sodium polyphosphates may be used in the calcium phosphate cement compositions, including sodium hexametaphosphate and sodium triphosphate, as well as vitreous sodium phosphates. In some embodiments, the sodium polyphosphates may be combined. An example of a suitable sodium polyphosphate is CALGON® sodium polyphosphate, available from Calgon Corporation, Pittsburgh, Pa. The sodium polyphosphate can be included in the calcium phosphate cement compositions in an amount desirable for a particular application as will be evident to those of ordinary skill in the art with the benefit of this disclosure. In some embodiments, the sodium polyphosphate may be present in an amount of about 0.5% to about 20% by weight of the composition. In certain embodiments, the sodium polyphosphate may be present in an amount of about 1% by weight, about 2% by weight, about 5% by weight, about 10% by weight, about 15% by weight, or about 20% by weight. One of ordinary skill in the art, with the benefit of this disclosure, should recognize the appropriate amount of the sodium polyphosphate to include for a chosen application.

Embodiments of the calcium phosphate cement compositions of the present invention further may comprise pumice. Generally, pumice is a volcanic rock that exhibits cementitious properties. It is believed that the pumice may react with the calcium aluminate to form calcium alumino silicate. Additional reactions between the pumice and components of the calcium phosphate cement composition may also occur. In present embodiments, the pumice can be of any size suitable for use in cementing operations. In an embodiment, the pumice can have a mean particle size of about 0.01 microns to about 2,000 microns, alternatively, about 1 micron to about 800 microns, and, alternatively, about 1 micron to about 100 microns. In some embodiments, the pumice can have a mean particle size of less than about 100 microns, less than about 50 microns, less than about 20 microns, less than about 15 microns, or less than about 10 microns. Without being limited to theory, due to increased activity of the pumice, the pumice having a smaller particle size range has been shown to exhibit greater increases in compressive strength for the set calcium phosphate cement as compared to pumice of a larger particle size.

The pumice can be included in the calcium phosphate cement compositions in an amount desirable for particular application. As previously mentioned, the pumice may be used as a replacement for fly ash in the embodiments of the calcium phosphate cement compositions. For example, the calcium phosphate cement compositions may be essentially free of fly ash. In some embodiments, the pumice may be present in an amount of about 15% to about 60% by weight of the composition. In certain embodiments, the pumice may be present in an amount of about 15% by weight, about 20% by weight, about 25% by weight, about 30% by weight, about 35% by weight, about 40% by weight, about 45% by weight, about 50% by weight, or about 55% by weight. One of ordinary skill in the art, with the benefit of this disclosure, should recognize the appropriate amount of the pumice to include for a chosen application.

Embodiments of the calcium phosphate cement compositions further may comprise perlite. Perlite is an ore and generally refers to a naturally occurring volcanic, amorphous siliceous rock comprising mostly silicon dioxide and aluminum oxide. A characteristic of perlite is that it may expand to form a cellular, high-porosity particle or hollow sphere containing multi-cellular cores when exposed to high temperatures due to the sudden vaporization of water within the perlite. In accordance with present embodiments, the perlite may be expanded or unexpanded as should be evident to those of ordinary skill in the art with the benefit of this disclosure.

In accordance with embodiments of the present invention, the perlite may be used as a replacement for fly ash in place of or in combination with the pumice. By way of example, embodiments of the calcium phosphate cement compositions may comprise calcium aluminate, sodium polyphosphate, pumice, perlite, and water. In some embodiments, the calcium phosphate cement compositions may comprise calcium aluminate, sodium polyphosphate, perlite, and water. Where used, the perlite generally can be of any suitable size for use in cement operations as desired for a particular application. In an embodiment, the perlite can have a mean particle size of about 0.01 microns to about 2,000 microns, alternatively, about 1 micron to about 800 microns and, alternatively, about 1 micron to about 100 microns.

The perlite can be included in the calcium phosphate cement compositions in an amount desirable for particular application. In some embodiments, the perlite may be present in an amount of about 15% to about 60% by weight of the composition. In certain embodiments, the perlite may be present in an amount of about 15% by weight, about 20% by weight, about 25% by weight, about 30% by weight, about 35% by weight, about 40% by weight, about 45% by weight, about 50% by weight, or about 55% by weight. One of ordinary skill in the art, with the benefit of this disclosure, should recognize the appropriate amount of the perlite to include for a chosen application.

The water used in embodiments of the calcium phosphate cement compositions of the present invention may be from any suitable source, including fresh water or salt water, for example. As used herein, the term "salt water" refers to unsaturated salt water and saturated salt water, including brines and seawater. Generally, the water may be from any source, provided that it should not contain an excess of compounds that may undesirably affect other components in the calcium phosphate cement composition. Further, the water may be present in an amount sufficient to form a pumpable slurry. In certain embodiments, the water may be present in the cement composition in an amount in the range of about 10% to about 60% by weight of the composition. One of ordinary skill in the art with the benefit of this disclosure will recognize the appropriate amount of water for a chosen application.

Embodiments of the calcium phosphate cement compositions further may comprise a set retarder. Examples of suitable set retarders that can be used in accordance with present embodiments include water-soluble carboxylic acids, such as gluconic acid, malic acid, lactic acid, acetic acid, tartaric acid, citric acid, formic acid, and combinations thereof. Generally, embodiments of the calcium phosphate cement compositions may include the set retarder in an amount sufficient to retard the setting of the calcium phosphate cement composition until a desired time after the calcium phosphate cement composition has been placed in a subterranean formation. More particularly, the set retarder may be included in the calcium phosphate cement compositions of the present invention in an amount up to about 2% by weight of the composition, for example.

Optionally, the calcium phosphate cement compositions of the present invention may be low-density cement compositions. For example, the calcium phosphate cement compositions of the present invention may be foamed with a gas to form a composition having a density of a about 4 lb/gal to about 14 lb/gal. The gas included in embodiments of the foamed calcium phosphate cement composition may be any gas suitable for foaming the composition, including, air, nitrogen, and mixtures thereof, for example. To facilitate foaming of the composition, foaming agents and/or foam stabilizers may also be included in the compositions as should be evident to those of ordinary skill in the art with the benefit of this disclosure.

Other additives suitable for use in subterranean cementing operations also may be included in embodiments of the calcium phosphate cement compositions. Examples of such additives include, but are not limited to, expansive additives, set accelerators, surfactants, fluid loss control additives, weighting agents, lightweight additives (e.g., microspheres), dispersants, elastic particles (e.g., inert ground rubber particles), gas-generating additives, lost circulation materials, defoaming additives, extending additives (e.g., cement kiln dust), and combinations thereof. A person having ordinary skill in the art, with the benefit of this disclosure, should readily be able to determine the type and amount of additive useful for a particular application and desired result.

As will be appreciated by those of ordinary skill in the art, embodiments of the calcium phosphate cement compositions of the present invention may be used in a variety of subterranean applications, including primary and remedial cementing. Embodiments of the calcium phosphate cement compositions may be introduced into a subterranean formation and allowed to set. By way of example, in example primary cementing embodiments, a calcium phosphate cement composition may be introduced into a space between a well bore wall and a conduit (e.g., a pipe string, liner, etc.). The calcium phosphate cement composition may be allowed to set to form a hardened, substantially impermeable mass in the space between the well bore wall and the conduit. In addition, in example remedial cementing embodiments, a calcium phosphate cement composition may used, for example, in squeeze cementing operations or in the placement of cement plugs.

To facilitate a better understanding of the present invention, the following examples of certain aspects of some embodiments are given. In no way should the following examples be read to limit, or define, the entire scope of the invention.

EXAMPLE 1

The following series of tests was performed to evaluate the impact on mechanical properties of calcium phosphate cement compositions when fly ash is replaced with pumice or perlite. Four different calcium phosphate cement compositions, designated Samples 1-4, were prepared using the indicated amounts of fly ash, calcium aluminate, sodium hexametaphosphate (SHMP), pumice, perlite, and/or water. Sample 1 was a comparative sample that comprised fly ash with calcium aluminate and sodium hexmatephosphate. In Samples 2-4, the fly ash was replaced with pumice or perlite as indicated in the table below. The abbreviation "g" in the table below indicates the grams of the component that were included in the composition. The calcium aluminate used in Sample 1, a comparative sample, was SECAR® 71 calcium aluminate, available from Kerneos™ Aluminate Technologies. The fly ash used in Sample 1 generally had a particle size of approximately 15 microns. The pumice used in Sample 2 was DS-200 pumice having a mean particle size of less than 20 microns while the pumice used in Sample was DS-325 pumice having a mean particle size of less than 15 microns. DS-200 pumice and DS-325 pumice are both available from Hess Pumice Products, Inc. The calcium phosphate cement compositions were cured at 140° F. and then subjected to compressive strength tests in accordance with API Specification 10. The results of the compressive strength tests are set forth in the table below.

TABLE 1

| | Ingredients | | | | | | | Compressive | |
| | | | | | | | | Strength (psi) | |
| Sample | Fly Ash | Calcium Aluminate | SHMP | DS-200 Pumice | DS-325 Pumice | Perlite | Water | 7 day | 33 day |
|---|---|---|---|---|---|---|---|---|---|
| 1 (comp.) | 380 g | 380 g | 40 g | — | — | — | 311 g | 2,880 | 3,800 |
| 2 | — | 380 g | 40 g | 380 g | — | — | 311 g | 1,616 | 2,240 |

TABLE 1-continued

| | Ingredients | | | | | | Compressive Strength (psi) | |
|---|---|---|---|---|---|---|---|---|
| Sample | Fly Ash | Calcium Aluminate | SHMP | DS-200 Pumice | DS-325 Pumice | Perlite | Water | 7 day | 33 day |
| 3 | — | 380 g | 40 g | — | 380 g | — | 311 g | 3,780 | 4,960 |
| 4 | — | 380 g | 40 g | — | — | 380 g | 311 g | 1,121 | 1,321 |

Based on the results of these tests, replacement of the fly ash in the calcium phosphate cement compositions with pumice or perlite can provide compositions with compressive strengths suitable for use in subterranean applications. Surprisingly, use of the DS-325 pumice having a mean particle size of less than 15 microns provided compressive strength enhancement of at least about 30% after 7 and 33 days.

EXAMPLE 2

The following series of tests was performed to evaluate the impact on thickening times of calcium phosphate cement compositions when fly ash is replaced with pumice or perlite. Samples 1-4 identified above were tested to determine their thickening times at 200° F., which is the time required for the compositions to reach 70 Bearden units of consistency. As indicated below, the thickening time for Sample 3 was repeated a number of times. A set retarder (HR®-25 cement set retarder) in the indicated amount was included in Sample 3 so that the thickening times for those samples would more closely match the thickening time of Sample 1. The results of the thickening time tests are set forth in Table 2 below.

TABLE 2

| Sample | Cement Set Retarder | Thickening Time hr:min (70 bc) |
|---|---|---|
| 1 (Comp.) | — | 8:10 |
| 2 | — | 3:00 |
| 3 | — | 4:48 |
| 3 | — | 4:47 |
| 3 | — | 4:40 |
| 3 | — | 5:10 |
| 3 | 8 g | 12:47 |
| 3 | 7 g | 9:09 |
| 3 | 6 g | 4:59 |
| 4 | — | 3:35 |

Therefore, Example 2 indicates that replacement of the fly ash in the calcium phosphate cement compositions with pumice or perlite can provide compositions with thickening times suitable for use in subterranean applications. In addition, the thickening time tests indicated good pump off for the tested compositions.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A well cement composition comprising:
   calcium aluminate;
   sodium polyphosphate in an amount of about 2% to about 20% by weight of the cement composition;
   an additive comprising pumice, wherein the additive has a mean particle size of less than about 15 microns; and
   water in an amount sufficient to form a pumpable slurry;
   wherein the additive is present in an amount that will increase a compressive strength of the well cement composition by at least 20% compared to the well cement composition comprising a comparable amount of fly ash instead of the additive.

2. The composition of claim 1 wherein the calcium aluminate is present in an amount of about 15% to about 60% by weight of the well cement composition.

3. The composition of claim 1 wherein the sodium polyphosphate comprises a polyphosphate selected from the group consisting of sodium hexametaphosphate, sodium triphosphate, a vitreous sodium phosphate, and any combination thereof.

4. The composition of claim 1 wherein the sodium polyphosphate is present in an amount of about 5% to about 20% by weight of the well cement composition.

5. The composition of claim 1 further comprising calcium alumino silicate.

6. The composition of claim 5 wherein the pumice has a mean particle size of about 0.01 microns to about 20 microns.

7. The composition of claim 5 wherein the pumice is present in an amount of about 15% to about 60% by weight of the well cement composition.

8. The composition of claim 1 wherein the well cement composition further comprises a second additive selected from the group consisting of an expansive additive, a set retarder, a foaming agent, a foam stabilizer, a set accelerator, a surfactant, a fluid loss control additive, a weighting agent, a lightweight additive, a dispersant, an elastic particle, a gas-generating additive, a lost circulation material, a defoaming additive, an extending additive, and any combination thereof.

9. The method of claim 1 wherein the well cement composition is essentially free of fly ash.

10. The composition of claim 1 wherein the well cement composition has a thickening time from 3 hours to about 12 hours and 47 minutes.

11. A well cement composition comprising:
calcium aluminate in an amount of about 15% to about 60% by weight of the cement composition;
sodium polyphosphate in an amount of about 2% to about 20% by weight of the cement composition;
pumice in an amount of about 15% to about 60% by weight of the cement composition, wherein the pumice has a mean particle size of less than about 15 microns;
a cement set retarder; and
water in an amount sufficient to form a pumpable slurry;
wherein the pumice is present in an amount that will increase a compressive strength of the well cement composition by at least 20% compared to the well cement composition comprising a comparable amount of fly ash instead of the pumice.

12. The composition of claim 11 wherein the calcium aluminate is present in an amount of about 15% to about 45% by weight of the well cement composition, wherein the sodium polyphosphate is present in an amount of about 2% to about 10% by weight of the well cement composition, wherein the pumice is present in an amount of about 15% to about 45% by weight of the well cement composition, and wherein the cement composition is essentially free of fly ash.

13. The composition of claim 11 wherein the sodium polyphosphate comprises a polyphosphate selected from the group consisting of sodium hexametaphosphate, sodium triphosphate, a vitreous sodium phosphate, and any combination thereof.

14. The composition of claim 11 wherein the cement set retarder is present in an amount up to about 2% by weight of the well cement composition.

15. The composition of claim 11 wherein the well cement composition further comprises an additive selected from the group consisting of an expansive additive, a set retarder, a foaming agent, a foam stabilizer, a set accelerator, a surfactant, a fluid loss control additive, a weighting agent, a lightweight additive, a dispersant, an elastic particle, a gas-generating additive, a lost circulation material, a defoaming additive, an extending additive, and any combination thereof.

16. The composition of claim 11 wherein the well cement composition has a thickening time from 3 hours to about 12 hours and 47 minutes.

* * * * *

UNITED STATES PATENT AND TRADEMARK OFFICE
CERTIFICATE OF CORRECTION

PATENT NO. : 9,499,731 B2  
APPLICATION NO. : 14/584281  
DATED : November 22, 2016  
INVENTOR(S) : Karcher et al.

Page 1 of 1

It is certified that error appears in the above-identified patent and that said Letters Patent is hereby corrected as shown below:

In the Claims

Column 9, Line 4, Claim 9 delete "method" and insert --composition--.

Signed and Sealed this
Twenty-first Day of February, 2017

Michelle K. Lee
*Director of the United States Patent and Trademark Office*